United States Patent
Beier et al.

(10) Patent No.: US 12,259,905 B2
(45) Date of Patent: Mar. 25, 2025

(54) DATA DISTRIBUTION IN DATA ANALYSIS SYSTEMS

(71) Applicant: International Business Machines Corporation, Armonk, NY (US)

(72) Inventors: Felix Beier, Haigerloch (DE); Dennis Butterstein, Stuttgart (DE); Einar Lueck, Filderstadt (DE); Sabine Perathoner-Tschaffler, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 17/448,713

(22) Filed: Sep. 24, 2021

(65) Prior Publication Data

US 2023/0101740 A1    Mar. 30, 2023

(51) Int. Cl.
  *G06F 7/00*   (2006.01)
  *G06F 11/14*  (2006.01)
  *G06F 16/22*  (2019.01)
  *G06F 16/23*  (2019.01)
  *G06F 16/27*  (2019.01)

(52) U.S. Cl.
  CPC .......... *G06F 16/27* (2019.01); *G06F 11/1471* (2013.01); *G06F 16/2255* (2019.01); *G06F 16/2358* (2019.01)

(58) Field of Classification Search
  CPC .. G06F 16/27; G06F 16/2255; G06F 16/2358; G06F 11/1471; G06F 16/273; G06F 16/275; G06F 16/278; G06F 11/1451; G06F 2201/80
  USPC .......................... 707/610, 615, 624, 625, 638
  See application file for complete search history.

(56) References Cited

U.S. PATENT DOCUMENTS

| 7,206,861 B1 * | 4/2007 | Callon ................ H04L 47/10 709/242 |
| RE48,243 E | 10/2020 | Pareek et al. |
| 2008/0104133 A1 | 5/2008 | Chellappa |
| 2010/0332448 A1 | 12/2010 | Holenstein |
| 2012/0254175 A1 | 10/2012 | Horowitz |

(Continued)

FOREIGN PATENT DOCUMENTS

| WO | WO-0207006 A1 * | 1/2002 | ............. G06F 16/27 |
| WO | WO 2022082406 A1 * | 4/2022 | ................ G06F 3/06 |

OTHER PUBLICATIONS

"About CDC Replication", IBM, Mar. 19, 2021, 5 pages, <https://www.ibm.com/support/knowledgecenter/SSTRGZ_11.3.3/com.ibm.cdcdoc.sysreq.doc/concepts/aboutcdc.html>.

(Continued)

*Primary Examiner* — Md I Uddin
(74) *Attorney, Agent, or Firm* — Daniel J Blabolil

(57) ABSTRACT

The present disclosure relates to a computer implemented method for data synchronization in a data analysis system. The data analysis system comprises a source and target database system. The method comprises: receiving a change record describing an operation performed on a data record in the source database system. The change record may be read for determining a value of a distribution key of the data record. The value of the distribution key may be used for selecting a target database node of the target database system where the operation is to be performed. A direct connection may be established to the selected target database node and the change record may be provided to the selected target database node through the direct connection.

18 Claims, 6 Drawing Sheets

(56) References Cited

U.S. PATENT DOCUMENTS

| | | |
|---|---|---|
| 2014/0108421 A1 | 4/2014 | Isaacson |
| 2016/0232208 A1 | 8/2016 | Duan et al. |
| 2017/0316026 A1 | 11/2017 | Kanthak |
| 2018/0253483 A1 | 9/2018 | Lee |
| 2018/0357264 A1 | 12/2018 | Rice |
| 2019/0332582 A1 | 10/2019 | Kumar |
| 2020/0026714 A1 | 1/2020 | Brodt |
| 2020/0034365 A1 | 1/2020 | Martin |
| 2020/0320059 A1 | 10/2020 | Kumar |
| 2020/0364185 A1 | 11/2020 | Beier |

OTHER PUBLICATIONS

"IBM InfoSphere Data Replication (Q and SQL Replication) and related PIDs, considerations for GDPR readiness", Mar. 22, 2021, 9 pages, <https://www.ibm.com/support/knowledgecenter/SSTRGZ_11.4.0/com.ibm.swg.im.iis.db.repl.intro.doc/topics/iiyrcgdpr.html>.

"Synopsis tables", IBM Documentation, May 9, 2021, 3 pages, < https://www.ibm.com/docs/en/db2/11.5?topic=organization-synopsis-tables>.

Beier et al., "Dynamic Selection of Data Apply Strategy During Database Replication", U.S. Appl. No. 16/815,415, filed Mar. 11, 2020, 53 pages.

Db2 tech talk using info sphere information server with db2, May 9, 21, 46 pages, <https://www.slideshare.net/albertspijkers/db2-tech-talk-using-info-sphere-information-server-with-db2>.

IBM, "Configuring the Db2 connector to use direct connections", IBM Documentation, Search in InfoSphere Information Server 11.7.0, printed on Jul. 27, 2021, 4 pages, <https://www.ibm.com/support/knowledgecenter/en/SSZJPZ_11.7.0/com.ibm.swg.im.iis.conn.db2db.usage.doc/topics/db2conn_configure_direct_connections.html>.

Sait et al., "Strategies for Migrating Oracle Databases to AWS", Last Update: Aug. 2018, Amazon Web Services, 38 pages, <https://d1.awsstatic.com/whitepapers/strategies-for-migrating-oracle-database-to-aws.pdf?did=wp_card&trk=wp_card>.

Stolze et al., "IDAA Cluster Load", printed on Jul. 27, 2021, 3 pages.

Beier et al., "Data Distribution in Target Database Systems", U.S. Appl. No. 17/448,715, filed Sep. 24, 2021, 48 pages.

IBM Appendix P, list of patents and patent applications treated as related, Filed Herewith, 2 pages.

* cited by examiner

DATA DISTRIBUTION IN DATA ANALYSIS SYSTEMS

BACKGROUND

The present invention relates to the field of digital computer systems, and more specifically, to a method for data synchronization in a data analysis system.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for moving data from one system to another. However, these approaches may need further improvement.

SUMMARY

Various embodiments provide a method for data synchronization in a data analysis system, replication system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for data synchronization in a data analysis system, the data analysis system comprising a target database system. The method comprises: receiving a change record describing an operation performed on a data record in a source database system of the data analysis system, determining a distribution key that is configured to be used by the target database system to distribute records over target database nodes of the target database system, reading the change record for determining a value of the distribution key of the data record, using the value of the distribution key for selecting a target database node of the target database nodes where the operation is to be performed, establishing a direct connection to the selected target database node, and providing the change record to the selected target database node through the direct connection.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a replication system for a data analysis system, the data analysis system comprising a source database system and a target database system. The replication system is configured for: receiving a change record describing an operation performed on a data record in the source database system, determining a distribution key that is configured to be used by the target database system to distribute records over target database nodes of the target database system, reading the change record for determining a value of the distribution key of the data record, using the value of the distribution key for selecting a target database node of the target database nodes where the operation is to be performed, establishing a direct connection to the selected target database node, providing the change record to the selected target database node through the direct connection.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1A:
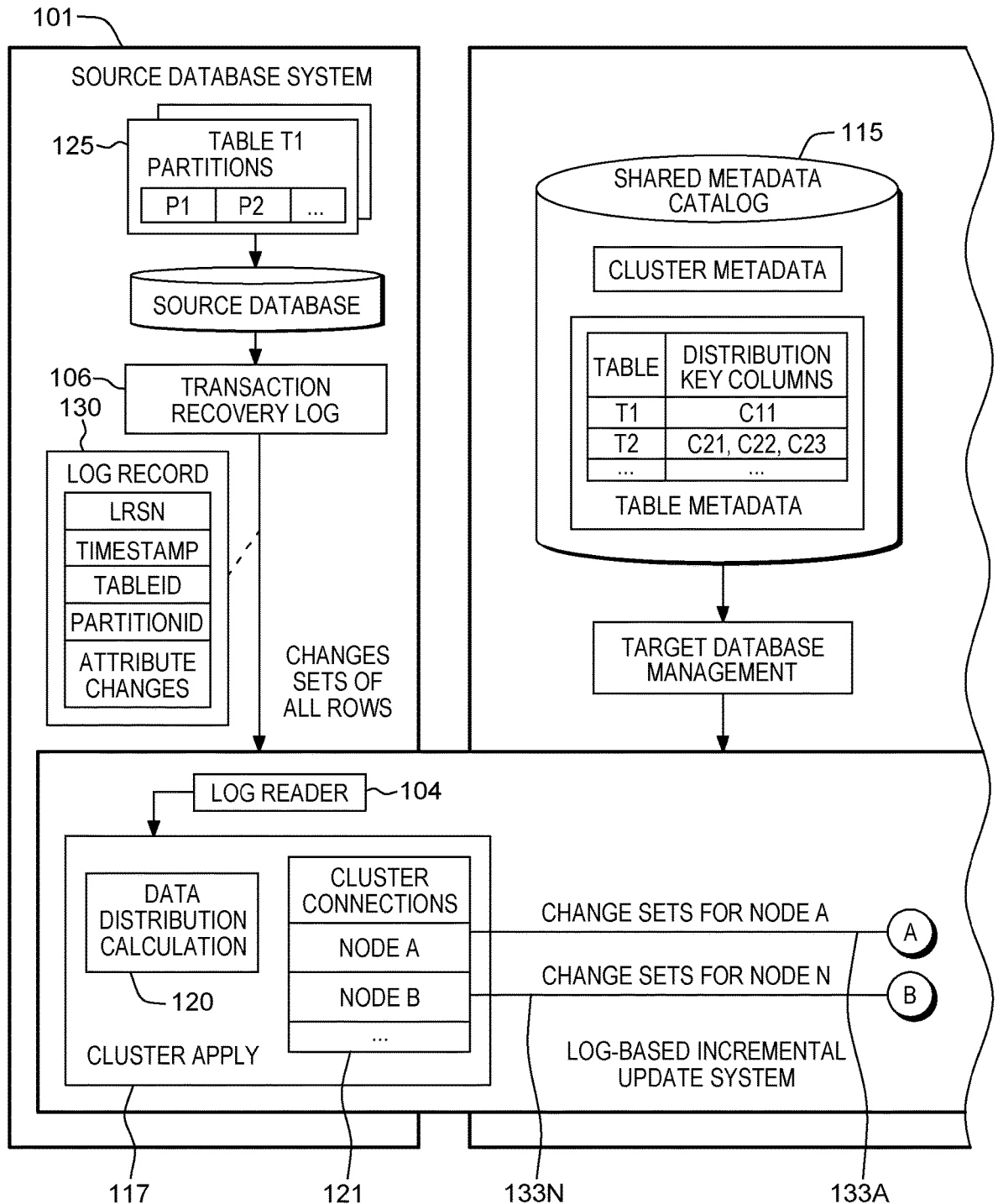
FIGS. 1A and 1B depict a data analysis system in accordance with an example of the present subject matter.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The content of the source dataset may be changed by one or more database transactions. The data analysis system may be log-based database replication system.

The target database system may comprise multiple target database nodes. The source database system may be connected to each of the target database nodes via a direct connection. The connection may, for example, be a TCP/IP connection or another connection enabling the communication of data via the connection between the source database system and the target database node. The target database node may comprise one or more database partitions. The database partition may be a part of a table that consists of its own data, indexes, configuration files, and transaction logs. Each of the target database nodes may store records of a table based on a value of a distribution key of the table. A data record or record of a table is a collection of related data items or attributes such as a name, date of birth and class of a particular user. A record represents an entity, wherein an entity refers to a user, object, or concept about which information is stored in the record. The data record may comprise values of a set of attributes. The distribution key of a table may be an attribute or group of attributes that may be used to determine the database partition in which a particular data record of the table is stored.

The data analysis system may be configured to replicate changes that occur in a source table of the source database system to the target database system so that said changes may be applied on a target table of the target database system that corresponds to the source table. Applying a change may, for example, comprise inserting one or more records and/or updating one or more records and/or deleting one or more records in one or more tables of the target database system. For that, multiple application algorithms (which may also be referred to as update strategies) may be provided, wherein each application algorithm specifies a sequence of replication operations to be performed in order to apply changes to the target database system. The application algorithms may, for example, comprise an incremental load-based algorithm and a bulk-load based algorithm. The incremental load-based algorithm may propagate changes with a frequency higher than a defined minimum frequency. The incremental load-based algorithm may, for example, require that each recorded change of a log record is applied individually in the target database system. The incremental load-based algorithm may particularly be advantageous for small data sets, because the overhead for large chunks may be high. The bulk-load based algorithm may propagate changes with a frequency smaller than a defined maximum frequency. The bulk load-based application algorithm may, for example, require that the recorded changes of log records are staged into batches. Those batches may then be applied via a bulk load interface to the target database system. The bulk load-based application algorithm may advantageously be used for large datasets. However, the overhead to setup the bulk load may be too high and should not be spent for small-sized chunks that are comprised of just a few rows.

The present subject matter may enable an efficient replication of changes in the data analysis system. The replication is efficient in that the changes are directly sent to the target nodes where they have to be applied. This may prevent proxying all data via a single target node and thus prevents an additional data transfer for all rows that are not stored on the single target node. If direct network connections are supported by additional hardware, between the source database system and each target node, the overall transfer bandwidth may be maximized compared to proxying all data via as single target node.

According to one embodiment, the method further comprises repeating the method for further received change records, thereby distributing the change records to respective target database nodes through respective direct connections.

According to one embodiment, the method is concurrently performed for the change records.

According to one embodiment, the method further comprises: determining a distribution rule of the target database system, the distribution rule being configured to assign a value of the distribution key to a respective target node, wherein selecting the target database node comprises applying the distribution rule on the determined value of the distribution key.

According to one embodiment, selecting the target database node for storing the data record comprises: providing a distribution map of hash values to connection numbers, wherein each connection number indicates a connection between the source database system and a respective target database node, computing a hash value of the determined value of the distribution key of the data record, using the distribution map for assigning the computed hash value to a connection number, wherein the connection is established according to the connection number.

According to one embodiment, receiving the change record comprises reading a transaction recovery log indicating transactions to be replicated to the target database system.

According to one embodiment, the type of operation includes at least one of inserting, deleting or updating a data record.

According to one embodiment, the distribution key comprises one or more attributes of the data record.

Figure 1B:
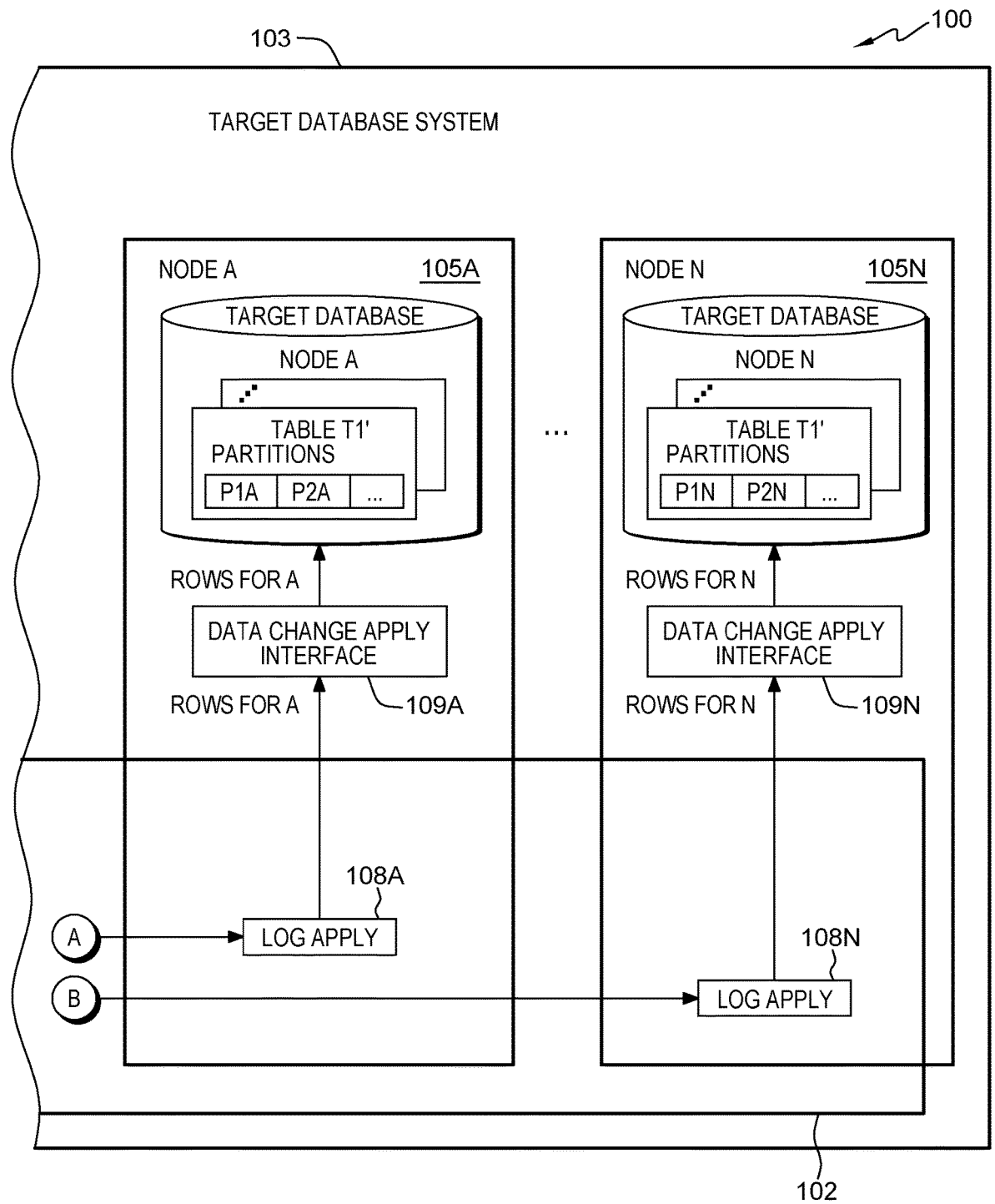

FIG. 1 is a block diagram of a data analysis system 100 in accordance with an example of the present subject matter. The data analysis system 100 may be configured for data synchronization between a source database system 101 and target database system 103 using data synchronization system 102 in accordance with an example of the present subject matter. The source database system 101 may, for example, be an online transaction processing (OLTP) system. The target database system 103 may, for example, be an online analytical processing (OLAP) system.

The source database system 101 comprises one or more source tables 125 of a source database and a transaction recovery log 106. Source tables 125 can be relational tables in DB2® for z/OS®, DB2 for Linux, UNIX, and Windows, and Oracle. The entries (also referred to as log records or change records) of the transaction recovery log 106 describe changes to rows or records of the source tables 125 at the source database system 101. FIG. 1 shows an example content of a change record 130. The change record 130 may comprise a timestamp, LRSN and attribute changes. More specifically, the change records in the transaction recovery log 106 may, for example, contain information defining (1) the table being changed, (2) the value of the distribution key in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction change records for inserted rows may contain only new column values while transaction change records for deleted rows may contain only old column values. Transaction change records for updated rows may contain the new and old values of all row columns. The order of change records in the transaction recovery log 106 may reflect the order of change operations of the transactions. The type of row operations in transaction change records can, for example, be delete, insert or update.

The target database system 103 may comprise N target database nodes 105A-105N, where N≥2. Each of the target database nodes 105A-105N may comprise portions of target tables that correspond to the source tables 125 respectively. As illustrated in FIG. 1, the source table T1 has a corresponding target table T1'. The target table T1' may be split over and stored on different partitions. For example, some of the rows of the table T1' may be stored on the target database node 105A e.g., in the partitions P1A and P2A and other rows of the table T1' may be stored on the target database node 105N e.g., in the partitions P1N and P2N. The content of the target table T1' and the source table T1 may be synchronized so that changes to the source table T1 may be applied to the target table T1'. An incremental update of the target tables T1' may be performed so that changes to the source tables T1 are propagated to the corresponding target tables T1' with a high frequency and just a brief delay (e.g., the frequency of change propagation is higher than a defined minimum frequency); the data synchronization system 102 may thus be referred to as log-based incremental update system. For that, each of the target database nodes 105A-105N may comprise an apply program 108A-108N. Each of the apply programs 108A-108N may be configured to receive streams of change records e.g., via a log streaming interface. Each of the apply programs 108A-108N may buffer the received change records and consolidate the changes into batches to improve efficiency when applying the modifications to the target tables of the target database e.g., via a bulk-load interface. In integrated synchronization, the extraction and preparation of the change records into batches may be done single threaded. Each of the apply programs 108A-108N may be configured to apply changes indicated in the change records into the target table via a respective data change apply interface 109A-N of the target database node. The target database system 103 may further comprise a metadata catalog and a target database management system 119. The metadata catalog comprises cluster metadata and table metadata 115. The table metadata 115 comprises information on the distribution keys of the target tables. The cluster metadata comprises information on target nodes such as their number and storage properties.

The data synchronization system 102 comprises a log reader 104. Although shown as part of the data synchronization system 102, the log reader 104 may, in another example, be part of the source database system 101. The log reader 104 may read change records of the transaction recovery log 106 and provide them to a cluster apply component 117. The cluster apply component 117 comprises a distribution module 120 and a list of connections 121. The list of connections 121 may refer to connections between the cluster apply component 117 and the target database nodes 105A-N. As sown in FIG. 1, the cluster apply component 117 has direct connections 133A-N to the respective target database nodes 105A-N. These connections may be established once when the incremental update pipeline is configured with help of the target database system metadata and may be adjusted, e.g., if the distribution key or the cluster topology changes. The connections may, for example, be TCP/IP connections. The connections may, for example, be referenced by connection umbers or connection names such as "Node A" as indicated in FIG. 1. The distribution module 120 may obtain the distribution key associated with the table T1 from the target database management system 119. The distribution module 120 may process each of the change records received at the cluster apply component 117 in order to read the value(s) of the distribution key and select one of the target database nodes 105A-105N of the target database system 103 where the change record shall be applied. The cluster apply component 117 may distribute the received change records through their respective connections to the apply algorithms 108A-N.

Although shown as separate components, the data synchronization system 102 may, in another example, be part of the source database system 101 or be part of the target database system 103. In one example, the source and target database systems 101 and 103 may be on the same system or on different systems in a distributed network.

Figure 2:
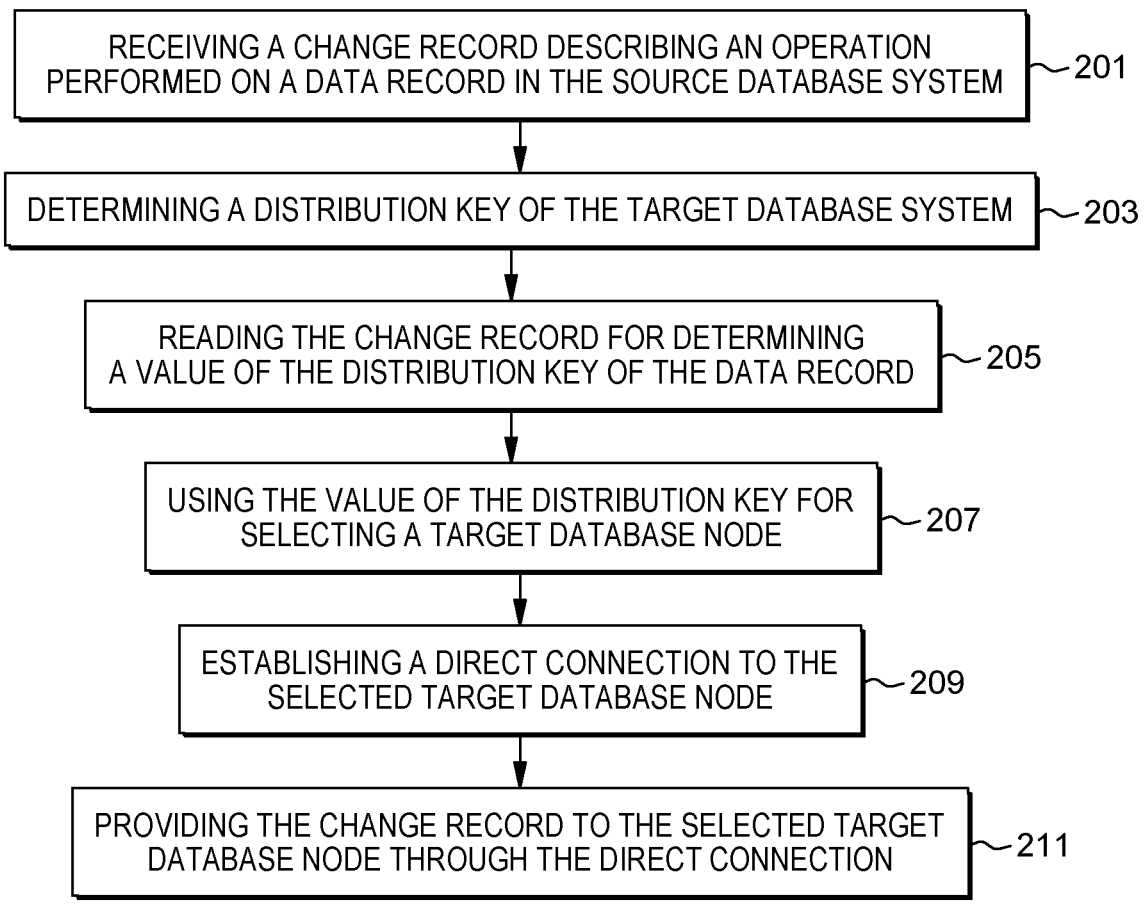
FIG. 2 is a flowchart of a method for replicating changes of a source table of a source database system to a target database system in accordance with an example of the present subject matter.

FIG. 2 is a flowchart of a method for replicating changes of a source table $T_s$ of a source database system to a target database system. For the purpose of explanation, the method described in FIG. 2 may be implemented in the system illustrated in FIG. 1, but is not limited to this implementation. The method of FIG. 2 may, for example, be performed by the source database system 101. The target database system 103 may comprise a target table $T_g$ which stores a copy of the source table $T_s$.

A change record 130 of the source table $T_s$ may be received in step 201. The change record may be received by reading the transaction log 106 and retrieving the change record 130 from the transaction log 106. The transaction log 106 may, for example, be read with a frequency higher than a defined minimum frequency, e.g., the transaction log 106 may be read every second or every minute. In another example, the transaction log 106 may be read as soon as it is modified. The source database system 101 may use the log reader 104 to monitor the content of the transaction log 106 in order to detect new log entries.

The received change record 130 may be a new entry of the transaction log 106 that has not yet been processed according to the present method. The change record 130 may, for example, be received as soon as it is saved in the transaction log 106. This may enable to process the change records one by one and as soon as they are saved. Processing the change records one by one as soon as they are saved may be advantageous as it may enable a quasi-continuous and real time synchronization of the tables $T_s$ and $T_g$. In another example, the received change record 130 may be one of multiple new change records that have been newly saved in the transaction log 106. This later example may advantageously be used in case the transaction log is read with a relatively small frequency.

The change record 130 may have been recorded in the transaction log 106 in response to a change in the source table $T_s$. The change record 130 may describe an operation performed on a data record e.g., $R_1$, of the source table $T_s$. If, for example, the operation is an insertion operation, the change record 130 may comprise the inserted data record $R_1$. The date record $R_1$ may be replicated and stored on the target table $T_g$ of the target database system 103. If, for example, the operation is an update operation of a data record $R_1$ of the table $T_s$, the change record 130 may comprise the old values of the data record $R_1$ and the new values of the data record $R_1$.

A distribution key of the table $T_g$ may be determined in step 203. The distribution key may be one or more attributes of the table $T_g$ that may be used by the target database system for distribution of records the table $T_g$ over the target database nodes 105A-N. The distribution key may be determined in step 203 so that the data distribution calculation may be moved from the target database system 103 to e.g., the source database system 101. The distribution key may be one or more attributes of the table $T_g$. If, for example, the table $T_g$ is an employee table, the distribution key may be the employee ID and/or the employee age. For example, the source database system 101 may query the target database system 103 for obtaining the distribution key used by the target database system 103 in relation to table $T_g$.

The change record 130 may be read in step 205 for determining a value of the distribution key in the data record $R_1$. The values of the one or more attributes that form the distribution key may be read from the data record $R_1$. The values of the one or more attributes may be the last values or most up-to date values of the one or more attributes. If, for example, the operation that caused the received change record is an update operation, the value of the distribution key may be the new value(s) of the distribution key if the distribution key was updated at least partially. Following the above example, the data record $R_1$ may be read in order to identify the values of the employee ID and/or employee age.

The value(s) of the distribution key may be used in step 207 for selecting a target database node of the target database nodes 105A-N where the change indicated in the received change record 130 may be applied. The selection may be performed using a distribution rule. The distribution rule may assign a change record to one of the target database nodes based on the value of the distribution key in the change record. For example, the employee records having an ID within a first range may be stored in the target database node 105A, while the employee records having an ID within a second range may be stored in the target database node 105B. Thus, it may be determined in step 207 to which range the value of the distribution key belongs and the corresponding target database node may be selected.

A direct connection may be established in step 209 to the selected target database node. The connection may be established upon selecting the target database node in step 207. This on-demand establishment connection may save resources that would otherwise be required by a connection that is established and not used. Alternatively, the connection may be established upfront e.g., the connections between the source database system 101 and each of the target database nodes 105A-N may be established once the target database nodes are defined as target for replicating or storing the table $T_g$.

The change record may be provided or sent in step 211 to the selected target database node through the established direct connection. The apply algorithm 108A-N of the selected target database node may use the change record in order to apply the change indicated in the change record to the partition of the table $T_g$ that is part of the selected target database node. If, for example, the change is caused by an insertion operation, the apply algorithm may insert the new data record $R_1$ in the partition of the table $T_g$ in the selected target database node. If, for example, the change is caused by an update operation, the apply algorithm may update the record $R_1$ of the target table $T_g$ by the new values of the data record $R_1$ indicated in the change record.

Figure 3:
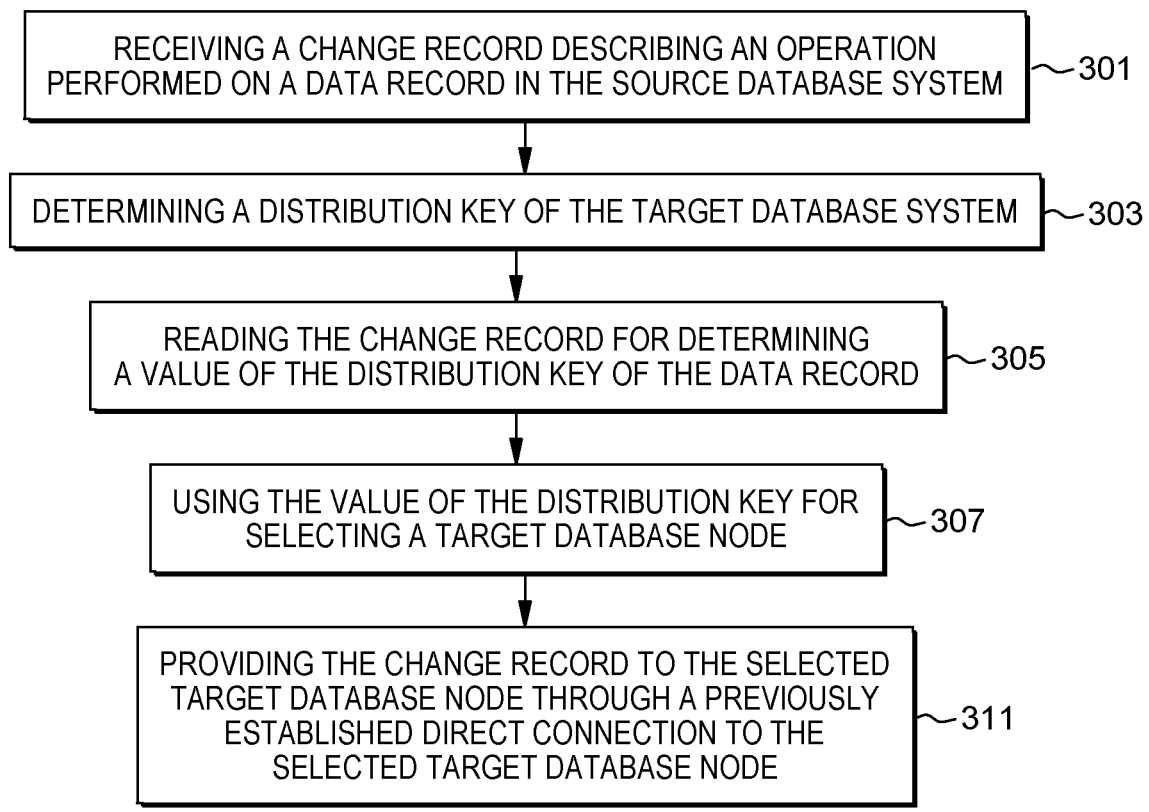
FIG. 3 is a flowchart of a method for replicating changes of a source table of a source database system to a target database system in accordance with an example of the present subject matter.

FIG. 3 is a flowchart of a method for replicating changes of a source table $T_s$ of a source database system. For the purpose of explanation, the method described in FIG. 3 may be implemented in the system illustrated in FIG. 1, but is not limited to this implementation. The method of FIG. 3 may, for example, be performed by the source database system 101. The target database system 103 may comprise a target table $T_g$ which stores a copy of the source table $T_s$. Connections 133A-N may be (pre)established between the source database system 101 and the target database nodes 105A-N respectively.

A change record 130 may be received in step 301. The change record may be received by reading the transaction log 106 and retrieving the change record 130 from the transaction log 106. The transaction log 106 may, for example, be read with a frequency higher than a defined minimum frequency, e.g., the transaction log 106 may be read every second or every minute. In another example, the transaction log 106 may be read as soon as it is modified. The source database system 101 may use the log reader 104 to monitor the content of the transaction log 106 in order to detect new log entries.

The received change record 130 may be a new entry of the transaction log 106 that has not yet been processed according to the present method. The change record 130 may, for example, be received as soon as it is saved in the transaction log 106. This may enable to process the change records one by one and as soon as they are saved. Processing the change records one by one as soon as they are saved may be advantageous as it may enable a quasi-continuous and real time synchronization of the tables $T_s$ and $T_g$. In another example, the received change record 130 may be one of multiple new change records that have been newly saved in the transaction log 106. This later example may advantageously be used in case the transaction log is read with a relatively high frequency.

The change record 130 may have been recorded in the transaction log 106 in response to a change in the source table $T_s$. The change record 130 may describe an operation performed on a data record $R_1$ of the table $T_s$. If, for example, the operation is an insertion operation, the change record 130 may comprise the inserted data record $R_1$. The date record $R_1$ may be replicated and stored on the target table $T_g$ of the target database system 103. If, for example, the operation is an update operation of a data record $R_1$ of the table $T_s$, the change record 130 may comprise the old values of the data record $R_1$ and the new values of the data record $R_1$.

A distribution key of the table $T_g$ may be determined in step 303. The distribution key may be one or more attributes of the table $T_g$ that may be used by the target database system for distribution of records over the target database nodes 105A-N. The distribution key may be determined in step 203 so that the data distribution calculation may be moved from the target database system 103 to e.g., the source database system 101. The distribution key may be one or more attributes of the table $T_g$. If, for example, the table $T_g$ is an employee table, the distribution key may be the employee ID and/or the employee age. For example, the source database system 101 may query the target database system 103 for obtaining the distribution key used by the target database system 103 in relation to table $T_g$.

The change record 130 may be read in step 305 for determining a value of the distribution key in the data record $R_1$. The values of the one or more attributes that form the distribution key may be read from the data record $R_1$. The values of the one or more attributes may be the last values or most up-to date values of the one or more attributes. If, for example, the operation that caused the received change record is an update operation, the value of the distribution key may be the new value(s) of the distribution key if the distribution key was updated at least partially. Following the above example, the data record $R_1$ may be read in order to identify the values of the employee ID and/or employee age.

The value(s) of the distribution key may be used in step 307 for selecting a target database node of the target database nodes 105A-B where the change indicated in the received change record 130 may be applied. The selection may be performed using a distribution rule. The distribution rule may assign a change record to one of the target database nodes based on the value of the distribution key in the change record. For example, the employee records having an ID within a first range may be stored in the target database node 105A, while the employee records having an ID within a second range may be stored in the target database node 105B. Thus, it may be determined in step 207 to which range the value of the distribution key belongs and the corresponding target database node may be selected.

The change record may be provided or sent in step 311 to the selected target database node through the preestablished direct connection between the source database system and the selected target database node. The apply algorithm 108A-N of the selected target database node may use the change record in order to apply the change indicated in the change record to the partition of the table $T_g$ that is part of the selected target database node. If, for example, the change is caused by an insertion operation, the apply algorithm may insert the new data record $R_1$ in the partition of the table $T_g$ in the selected target database node. If, for example, the change is caused by an update operation, the apply algorithm may update the record $R_1$ of the target table $T_g$ by the new values of the data record $R_1$ indicated in the change record.

Figure 4:
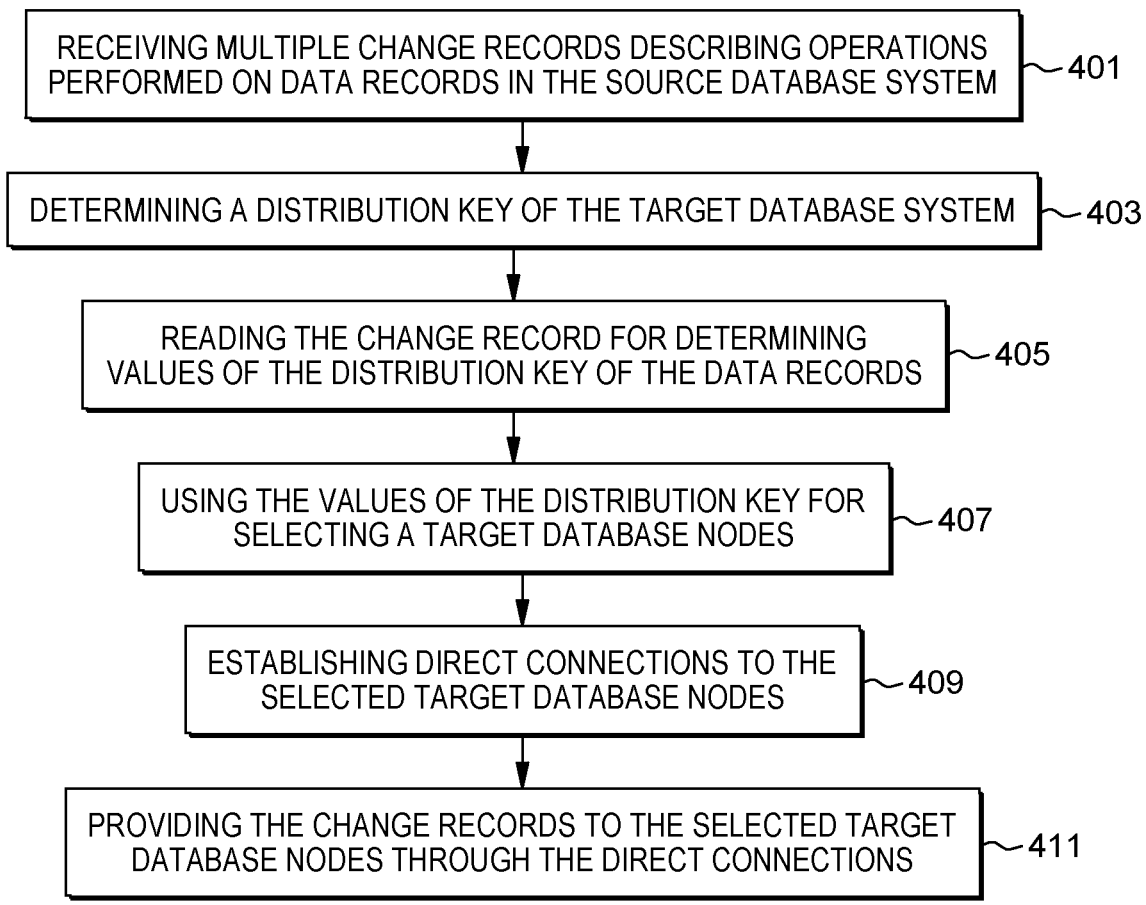
FIG. 4 is a flowchart of a method for replicating changes of a source table of a source database system to a target database system in accordance with an example of the present subject matter.

FIG. 4 is a flowchart of a method for replicating changes of a source table $T_s$ of a source database system. For the purpose of explanation, the method described in FIG. 4 may be implemented in the system illustrated in FIG. 1, but is not limited to this implementation. The method of FIG. 4 may, for example, be performed by the source database system 101. The target database system 103 may comprise a target table $T_g$ which stores a copy of the source table $T_s$.

Multiple change records may be received in step 401 e.g., K change records. The change records may be received by reading the transaction log 106 and retrieving the change records from the transaction log 106. The transaction log 106 may, for example, be read with a frequency higher than a defined minimum frequency, e.g., the transaction log 106 may be read every 5 minutes. The source database system 101 may use the log reader 104 to monitor the content of the transaction log 106 in order to detect new log entries.

Each of the K change records may describe an operation performed on a respective data record $R_i$ of the table $T_s$, where i is an index running e.g., from 1 to K.

A distribution key of the target table $T_g$ may be determined in step 403. The distribution key may be one or more attributes of the target table $T_g$ that may be used by the target database system for distribution of records over the target database nodes 105A-N. The distribution key may be determined in step 403 so that the data distribution calculation may be moved from the target database system 103 to e.g., the source database system 101. The distribution key may be one or more attributes of the target table T g. For example, the source database system 101 may query the target database system 103 for obtaining the distribution key used by the target database system 103 in relation to table $T_g$.

Each $i^{th}$ change record of the received change records may be read in step 405 for determining a value of the distribution key in the respective data record $R_i$. The values of the one or more attributes that form the distribution key may be read from the data record $R_i$. The values of the one or more attributes may be the last values or most up-to date values of the one or more attributes. This may result in the values of the distributions key: $Key_1, Key_2 \ldots Key_K$ for the records $R_1, R_2 \ldots R_K$ respectively.

The determined values $Key_1, Key_2 \ldots Key_K$ of the distribution key may be used in step 407 for selecting target database nodes of the target database nodes 105A-B where the changes indicated in the received change records may be applied. The selection may be performed using a distribution rule. The distribution rule may assign a change record to one of the target database nodes based on the value of the distribution key in the change record. For example, for each value $Key_1, Key_2 \ldots Key_K$, a target database node may be selected. This may result in a number J of selected target database nodes, which is at most equal to the number of data records K i.e., J≤K.

A number J of direct connections may be established in step 409 to the J selected target database nodes respectively. The connections may be established upon selecting the target database node in step 407. Alternatively, the connections may be established upfront e.g., the connections between the source database system 101 and each of the N target database nodes 115A-N may be established once the target database nodes are defined as target for replicating or storing the table $T_g$.

The received change records may be provided or sent in step 411 to the associated selected target database nodes through the established direct connections respectively. The apply algorithm of each of the selected target database nodes may use the respective change record(s) in order to apply the change indicated in the change record to the partition of the table $T_g$ that is part of the selected target database node. If, for example, the change is caused by an insertion operation, the apply algorithm may insert the new data record $R_i$ in the partition of the table $T_g$ in the selected target database node.

In one example implementation, steps 405 to 411 may be performed on individual change records and in parallel for the K received change records e.g., K parallel execution of steps 405 to 411 for the K received change records respectively. For example, a multiprocessor system may be used for the parallel execution of the steps 405 to 411.

Figure 5:
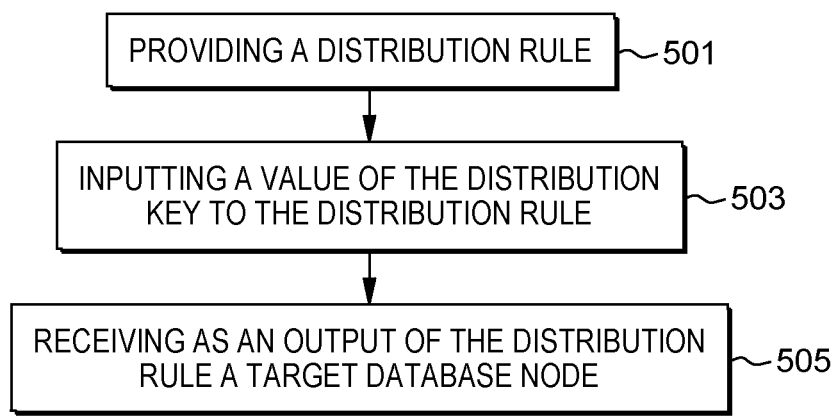
FIG. 5 is a flowchart of a method for selecting target database nodes in accordance with an example of the present subject matter.

FIG. 5 is a flowchart of a method for selecting target database nodes based on the distribution key. For the purpose of explanation, the method described in FIG. 5 may be implemented in the system illustrated in FIG. 1, but is not limited to this implementation. The method of FIG. 5 provides an example implementation of steps 207, 307 and 407.

A distribution rule may be provided in step 501. The distribution rule may, for example, be obtained by the source database system from the target database system.

The distribution rule may comprise a rule logic, wherein the rule logic is configured to receive as input the value(s) of the distribution key and the target database nodes 105A-N and provides as an output a target database node that would receive the data record having the distribution key.

The value of the distribution key may be input in step 503 to the distribution rule. And an indication of the target database node may be received in step 505 as an output of the distribution rule.

Figure 6:
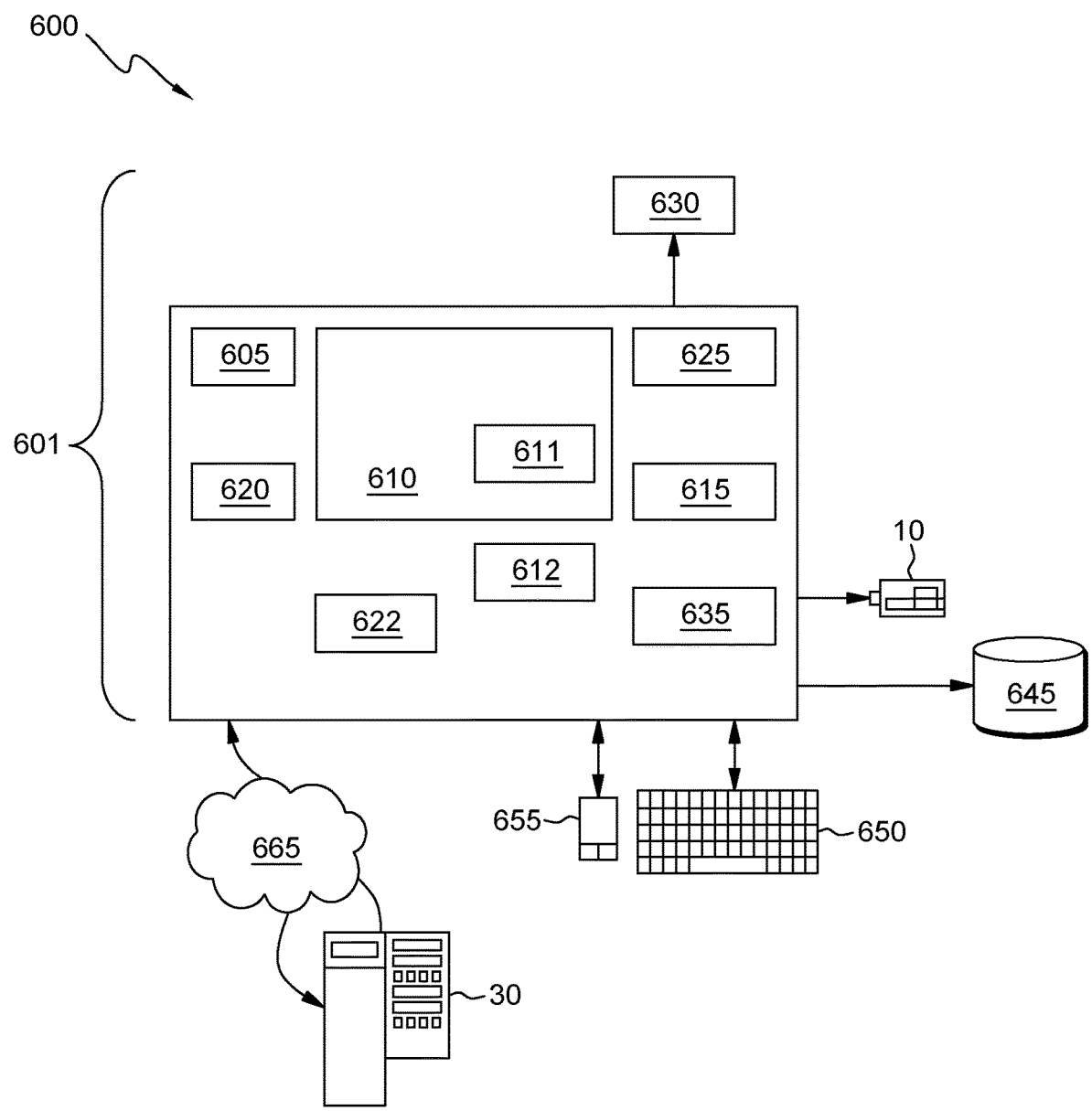
FIG. 6 represents a computerized system, suited for implementing one or more method steps as involved in the present disclosure.

FIG. 6 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 6, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 6, software in the memory 610 includes instructions 612 e.g. instructions to manage databases such as a database management system.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at start-up, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 6, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for data synchronization in a data analysis system, the data analysis system comprising a target database system and a source database system, the method comprising
retrieving a change record describing an operation performed on a data record in the source database system of the data analysis system based on reading a transaction log associated with the source database system with a frequency higher than a defined minimum frequency;

determining a distribution key that is configured to be used by the target database system to distribute records over target database nodes of the target database system, wherein the target database system comprises a metadata catalog that includes cluster metadata and table metadata, the table meta comprising information on a total number of the target database nodes and storage properties of the target database nodes and the cluster metadata comprising information on the distribution key;

reading the change record for determining a value of the distribution key of the data record;

using the value of the distribution key for selecting a target database node of the target database nodes where the operation is to be performed, wherein selecting the target database node for storing data record comprises providing a distribution map of hash values to connection numbers, wherein each connection number indicates a connection between the source database system and a respective target database node, computing a hash value of the determined value of the distribution key of the data record, and using the distribution map for assigning the computed hash value to a connection number, wherein the connection is established according to the connection number;

establishing a direct TCP/IP connection between the source database system and the selected target database node; and providing the change record to the selected target database node through the direct connection.

2. The method of claim 1, repeating the method for further received change records, thereby distributing the change records to respective target database nodes through respective direct connections.

3. The method of claim 2, the method being concurrently performed for the change records.

4. The method of claim 1, further comprising determining a distribution rule of the target database system, the distribution rule assigning values of the distribution key to respective target database nodes;

wherein selecting the target database node comprises applying by the source database system the distribution rule on the determined value of the distribution key.

5. The method of claim 1, wherein receiving the change record comprises reading a transaction recovery log indicating transactions to be replicated to the target database system.

6. The method of claim 1, wherein the operation includes at least one of inserting, deleting or updating a data record.

7. The method of claim 1, the distribution key comprising one or more attributes of the data record.

8. A computer program product for data synchronization in a data analysis system, the data analysis system comprising a target database system and a source database system, the computer program product comprising a non-transitory computer readable hardware storage device, and program instructions stored on the computer readable hardware storage device, to:

retrieve a change record describing an operation performed on a data record in the source database system of the data analysis system based on reading a transaction log associated with the source database system with a frequency higher than a defined minimum frequency;

determine a distribution key that is configured to be used by the target database system to distribute records over target database nodes of the target database system, wherein the target database system comprises a metadata catalog that includes cluster metadata and table metadata, the table meta comprising information on a total number of the target database nodes and storage properties of the target database nodes and the cluster metadata comprising information on the distribution key;

read the change record for determining a value of the distribution key of the data record;

use the value of the distribution key for selecting a target database node of the target database nodes where the operation is to be performed, wherein selecting the target database node for storing data record comprises providing a distribution map of hash values to connection numbers, wherein each connection number indicates a connection between the source database system and a respective target database node, computing a hash value of the determined value of the distribution key of the data record, and using the distribution map for assigning the computed hash value to a connection number, wherein the connection is established according to the connection number;

establish a direct TCP/IP connection between the source database system and the selected target database node; and provide the change record to the selected target database node through the direct connection.

9. The computer program product of claim 8, wherein the computer readable storage device further comprises instructions to repeatedly receive change records, thereby distributing the change records to respective target database nodes through respective direct connections.

10. The computer program product of claim 9, wherein the computer readable storage device further comprises instructions that are concurrently performed for the change records.

11. The computer program product of claim 8, wherein the computer readable storage device further comprising instructions to:

determine a distribution rule of the target database system, the distribution rule assigning values of the distribution key to respective target database nodes; and wherein selecting the target database node comprises applying by the source database system the distribution rule on the determined value of the distribution key.

12. The computer program product of claim 8, wherein the computer readable storage device instructions to receive the change record further comprise reading a transaction recovery log indicating transactions to be replicated to the target database system.

13. The computer program product of claim 8, wherein the operation includes at least one of inserting, deleting or updating a data record.

14. The computer program product of claim 8, wherein the distribution key comprising one or more attributes of the data record.

15. A computer system for a data analysis system, the data analysis system comprising a source database system and a target database system, the computer system including one or more non-transitory computer-readable storage media configured to store program instructions and one or more computer processors configured to execute said program instructions store on the one or more non-transitory computer-readable storage media, the computer system being configured for:

receiving a change record describing an operation performed on a data record in the source database system;

determining a distribution key that is configured to be used by the target database system to distribute records over target database nodes of the target database system, wherein the target database system comprises a metadata catalog that includes cluster metadata and table metadata, the table meta comprising information on a total number of the target database nodes and storage properties of the target database nodes and the cluster metadata comprising information on the distribution key;

reading the change record for determining a value of the distribution key of the data record;

using the value of the distribution key for selecting a target database node of the target database nodes where the operation is to be performed, wherein selecting the target database node for storing data record comprises providing a distribution map of hash values to connection numbers, wherein each connection number indicates a connection between the source database system and a respective target database node, computing a hash value of the determined value of the distribution key of the data record, and using the distribution map for assigning the computed hash value to a connection number, wherein the connection is established according to the connection number;

establishing a direct connection to the selected target database node; and providing the change record to the selected target database node through the direct connection.

16. The computer system of claim 15, wherein the computer system is further configured to repeatedly receive change records, thereby distributing the change records to respective target database nodes through respective direct connections.

17. The computer system of claim 15, wherein the computer system is comprised in the source database system.

18. The computer system of claim 15, wherein the computer system is remotely connected to the source database system.

* * * * *